United States Patent [19]

Burgess et al.

[11] Patent Number: 4,845,393
[45] Date of Patent: Jul. 4, 1989

[54] RADIO FREQUENCY SUPPRESSION FOR FUEL PUMP

[76] Inventors: James P. Burgess, 1210 Fairway Dr., Camarillo, Calif. 93010; Harold Moy, 3622 Worthington Ct., Rochester Hills, Mich. 48309

[21] Appl. No.: 145,888

[22] Filed: Jan. 20, 1988

[51] Int. Cl.[4] .................. H02K 5/24; H02K 13/00; H04B 15/02

[52] U.S. Cl. ..................... 310/51; 123/497; 336/192; 417/410; 310/239

[58] Field of Search ............... 123/497; 310/43, 5 D, 310/51, 71, 72, 68 D, 89, 208, 220, 239, 249; 318/128; 336/192; 455/297, 298; 417/410

[56] References Cited
U.S. PATENT DOCUMENTS 1,410,682  3/1922  Kettering .................... 123/497
3,189,824  6/1965  Hill ............................. 455/297
3,868,766  3/1975  Gramlich et al. ........... 310/208
4,065,740 12/1977  Earhart et al. .............. 336/192
4,080,552  3/1978  Brown ........................ 318/128
4,081,740  3/1978  Teratani et al. ............. 455/297
4,188,599  2/1980  Papa ........................... 336/192
4,638,196  1/1987  Kränzler ..................... 310/50
4,727,274  2/1988  Adam et al. ................ 310/71
4,728,835  3/1988  Baines ........................ 310/89
4,748,356  5/1988  Okashiro et al. ........... 310/43

Primary Examiner—Patrick R. Salce
Assistant Examiner—D. L. Rebsch
Attorney, Agent, or Firm—Krass & Young

[57] ABSTRACT

An end cap for a fuel pump provides suppression of radio frequency noise generated by the motor of the pump. The end cap includes radio frequency suppression circuitry disposed therewithin and is configured so as to be a direct replacement for conventionally utilized end caps.

18 Claims, 2 Drawing Sheets

RADIO FREQUENCY SUPPRESSION FOR FUEL PUMP

BACKGROUND OF THE INVENTION

This invention relates generally to devices for the suppression of electromagnetic noise, particularly noise within the radio frequency portion of the electromagnetic spectrum. More specifically, this invention relates to a fuel pump end cap for a motor vehicle having a radio frequency noise suppression system incorporated therein.

BACKGROUND OF THE INVENTION

Automobiles and other motor vehicles are becoming increasingly more complex in terms of the systems and equipment associated therewith. Such sophisticated systems can create radio frequency noise and at the same time other systems require increased levels of protection from such noise. For example, audio systems presently employed in motor vehicles are becoming more sophisticated with regard to sensitivity and fidelity of sound reproduction and such systems consequently are more prone to be detrimentally affected by stray radio frequency noise. Similarly, sophisticated communication systems such as two-way radios, cellular telephones and the like are also adversely affected by stray noise.

Previously, such problems have been dealt with by modification of the equipment experiencing the interference as for example by shielding or compensating circuits included therein. U.S. Pat. No. 3,189,824 details the use of a noise suppression circuit in a radio receiver to improve fidelity thereof. While it is possible to shield the equipment itself, it has been found more advantageous to stop unwanted radio frequency signals at their source.

Presently the problem of radio frequency noise is generally dealt with by the use of "add on" noise suppressors disposed in close proximity to vehicle systems producing such noise. Radio frequency suppression devices of this type generally take the form of units externally mounted upon the power connections of the offending equipment. Such add on systems take up space which is often at a premium in motor vehicles and additionally require separate installation steps, thereby necessitating excess labor. Additionally, such separate noise suppressor systems necessitate the making of an additional set of contacts and interpose additional discrete hardware, all of which is prone to increase the failure rate of the system.

The fuel pump of motor vehicles is one significant source of radio frequency noise. Such pumps generally include one or more solenoid pumps, and the rapidly changing magnetic fields in the solenoids represent a serious noise hazard. Additionally, space in the region of a fuel pump is generally at a premium. Consequently, it is desirable to include a noise suppressor in conjunction with a fuel pump, and it is particularly desirable that the suppressor not significantly increase the volume of the pump, or otherwise necessitate redesign of the space occupied by the pump.

U.S. Pat. No. 4,080,552 discloses a particular design of fuel pump having a temperature compensated oscillator circuit for powering a pumping solenoid thereof. The afore-mentioned patent briefly mentions that a noise suppression circuit may also be employed in conjunction with the fuel pump. While the '552 patent does acknowledge the need for a noise suppression in a fuel pump, it does not teach the use of any particular circuitry or any particular disposition for that noise suppressor.

It should be apparent from the foregoing that noise suppression circuitry is particularly important and it would be highly desirable to include such circuitry in a fuel pump. Heretofore, externally mounted noise suppressors have been used in connection with fuel pumps. However, presently manufactured and employed fuel pumps do not include noise reduction circuitry integral therewith. To rebuild the pumps to incorporate said circuitry would necessitate redesign, retooling and significant expenditures in terms of time and money. Accordingly, it is highly desirable that there be provided a noise suppressor which does not necessitate redesign of the fuel pump and which may be readily incorporated in present assembly techniques for motor vehicle fuel pumps. It is further desired that the noise suppressor not significantly alter the dimensions of the fuel pump so as to make most economical use of space and avoid redesign of the space allocated for the pump.

The present invention provides for a noise suppressor which may be integrally built into the end cap of a fuel pump of conventional design. The noise suppressor takes up very little room and, since the end cap is a direct replacement for heretofore employed fuel pump end caps, it may be readily installed without the need for specialized tooling or training. Through the use of the present invention, noise suppression may thus be economically and reliably added to a fuel pump. These and other advantages of the present invention will be readily apparent from the drawings, description, discussion and claims which follow.

SUMMARY OF THE INVENTION

There is disclosed herein a unitary, radio frequency suppression system for a fuel pump. The system comprises a radio frequency noise suppression circuit adapted to be interposed between the fuel pump motor and the power supply for the motor. The circuit is further adapted to pass direct or low frequency current to the motor while blocking the flow of radio frequency signals generated thereby. The suppression system further includes a pair of motor brushes in electrical communication with the noise suppression circuit to establish sliding electrical contact with the armature of the pump motor, and a housing to support and retain the circuit and brushes in a predetermined spatial relationship. The housing is adapted to function as a fuel pump end cap and provides (1) a pair of terminals adapted to establish electrical communication with the noise suppression circuit and (2) a discharge outlet for the pump. In this manner, the suppression system combines the fuel pump end cap function and noise suppression function within a single, compact unit.

In one particular embodiment, the circuit includes at least one radio frequency choke coil and at least one capacitor, one plate of the capacitor disposed in electrical communication with the coil. In yet another embodiment, the noise suppression circuit includes two radio frequency choke coils which in some instances may include ferrite slugs therein. The circuits may in other embodiments include a pair of coils and a capacitor, a first plate of the capacitor in electrical communication with one of the coils and a second plate of the capacitor in electrical communication with the other of the coils so that the capacitor is disposed in parallel electrical relationship with the motor terminals.

The choke coils may include coined ends which are supported within the housing so as to form a pair of terminals associated therewith. A second end of each of the coils may be disposed in electrical communication with one of the motor brushes as, for example, via a contact clip. The electrical circuit may be at least partially encapsulated within the housing and the housing may include a plurality of attachment prongs adapted to engage the housing to the remainder of the fuel pump.

DETAILED DESCRIPTION OF THE INVENTION

Figure 1:
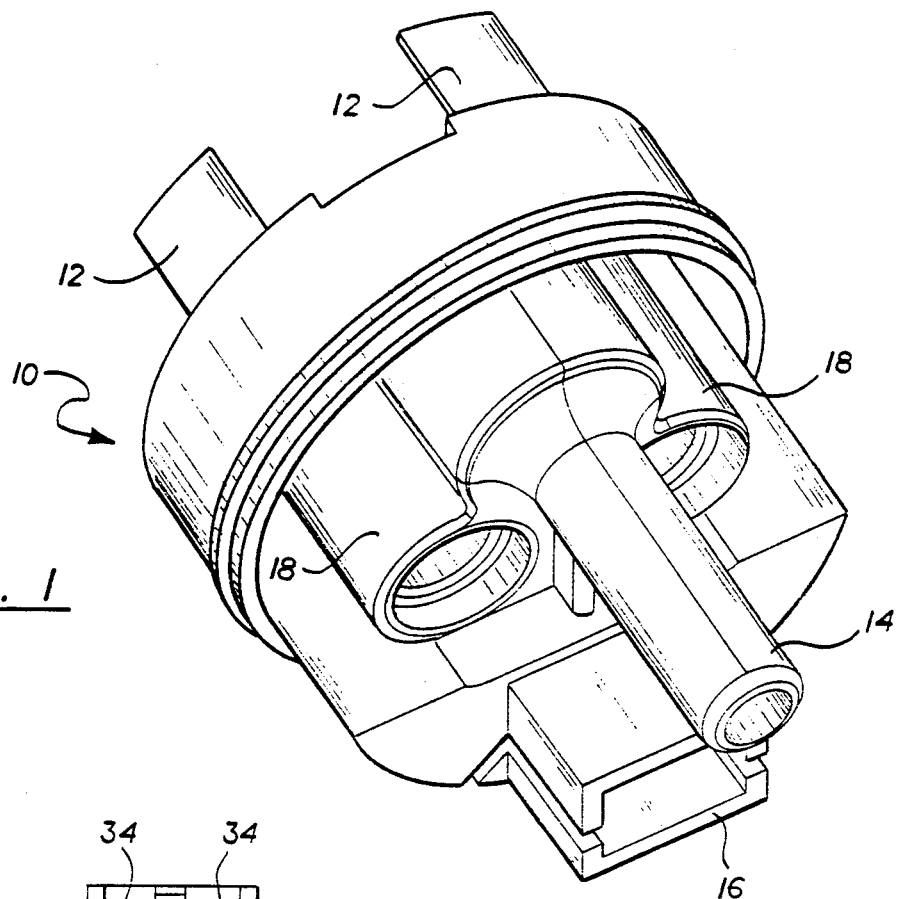
FIG. 1 is a perspective view of a radio frequency suppressing fuel pump end cap structured in accord with the principles of the present invention.

Referring now to FIG. 1, there is shown a perspective view of one particular fuel pump end cap structured in accord with the principles of the present invention and including therein a radio frequency suppression circuit. The outer body of the end cap 10 is fabricated from a gasoline-resistant material such as PBT polyester either filled or unfilled, nylon, epoxies, melamine or other such synthetic polymeric materials. Included in the end cap are positioning lugs 12 associated with the base, securing the end cap to the remaining portion of the fuel pump. Also included on the end cap is a discharge port 14 through which the associated fuel pump discharges gasoline, and which is configured to receive and retain a fuel line or other coupling thereupon.

The end cap 10 is molded to form a connector housing 16 adapted to receive an electrical supply connection for purposes of energizing the associated fuel pump. Also visible in FIG. 1 are a pair of cylindrical cavities 18 to retain a pair of radio frequency choke coils 20 therein. It should be noted that in some instances, and as will be described in greater detail hereinbelow, the coils and various other components of the radio frequency suppression circuitry are encapsulated within the housing.

What is noteworthy about the end cap 10 of FIG. 1 is that in addition to providing radio frequency suppression, it is configured so as to directly replace presently utilized non-radio frequency suppressing fuel pump end caps. This direct replacement capability allows for the addition of radio frequency suppression to a fuel delivery system without the necessity of redesigning the fuel pump body or redesigning the system to accommodate excess circuitry. Additionally, by disposing the fuel suppression circuitry in close proximity to the fuel pump motor, the efficiency of the noise suppression is enhanced.

There are a great variety of circuits available for suppressing radio frequency noise, the essence thereof being that said circuits present a high resistance to the flow of radio frequency energy therethrough while permitting direct current or relatively low frequency current to pass freely. By relatively low frequency is meant alternating current having a frequency not exceeding approximately 60-100 hertz.

Radio frequency suppression circuits generally include capacitors, which act as resistances to direct and low frequency current while permitting relatively unimpeded passage of high frequency current. By appropriately disposing a capacitor, radio frequency signals can be shunted to ground without affecting dc or low frequency currents. Radio frequency suppression circuits also frequently include one or more choke coils. These elements generally comprise numerous turns of a conductive material wrapped about a cylindrical ferromagnetic body; although in some instances, the ferromagnetic slug may be omitted. Any flow of electrical energy has a magnetic field associated therewith and a rapidly changing flow such as a radio frequency current will have a rapidly changing magnetic field associated therewith. The magnetic field provides an impedance to current flow which is proportional, inter alia, to the rate at which the field is changing, and the coiled configuration enhances the impedance. Consequently, a choke coil will present a much greater resistance to a flow of high frequency current than to a flow of direct or low frequency current. By properly disposing one or more coils, the flow of radio frequency energy may be blocked while the flow of direct current or low frequency current will be relatively unimpeded.

Figure 4:
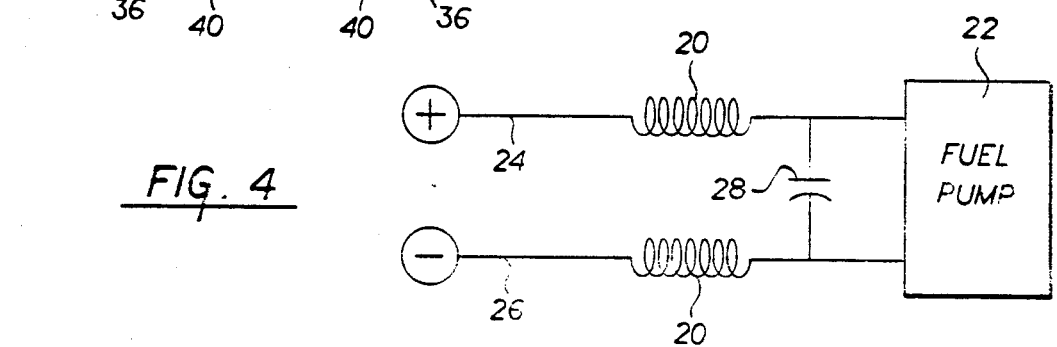
FIG. 4 is a schematic diagram of one radio frequency suppression circuit adapted for use in the present invention.

With this in mind, we now turn to FIG. 4, which is a generalized schematic diagram of one particular radio frequency suppression circuit which may be employed in conjunction with the present invention. The circuit of FIG. 4 energizes a fuel pump 22 or other such power-consuming accessory in an automobile. Power is provided from a battery, generator, alternator or other such power source in the form of direct current as is shown in FIG. 4 by a positive lead 24 and a negative lead 26. Each of the leads 24,26 communicate with the fuel pump 22 via a radio frequency choke coil 20, which may be an air core coil or may include a ferromagnetic slug therein. Generally the inclusion of a slug formed from a "soft" magnetic material such as soft ferrite enhances the radio frequency suppression properties of the coil 20.

The circuit of FIG. 4 also includes a capacitor 28 disposed in parallel relationship with the positive lead 24 and the negative lead 26. In operation, the capacitor 28 short circuits the radio frequency noise generated by the fuel pump, while acting as a resistance preventing any short circuiting of the DC energy. The coils 20 serve to permit a flow of direct current energy from the leads 24,26 to the fuel pump 22 while impeding the flow of radio frequency energy from the fuel pump back through the remainder of the power delivery circuit of the automobile. It will be appreciated by those of skill in the electronic arts that various other configurations of elements may be disposed to accomplish the same end and accordingly other circuits may be employed in the present invention. For example, a single coil may be employed, or multiple capacitors may be employed, or in some instances sufficient noise suppression can be had from a single capacitor or coil.

Figure 2:
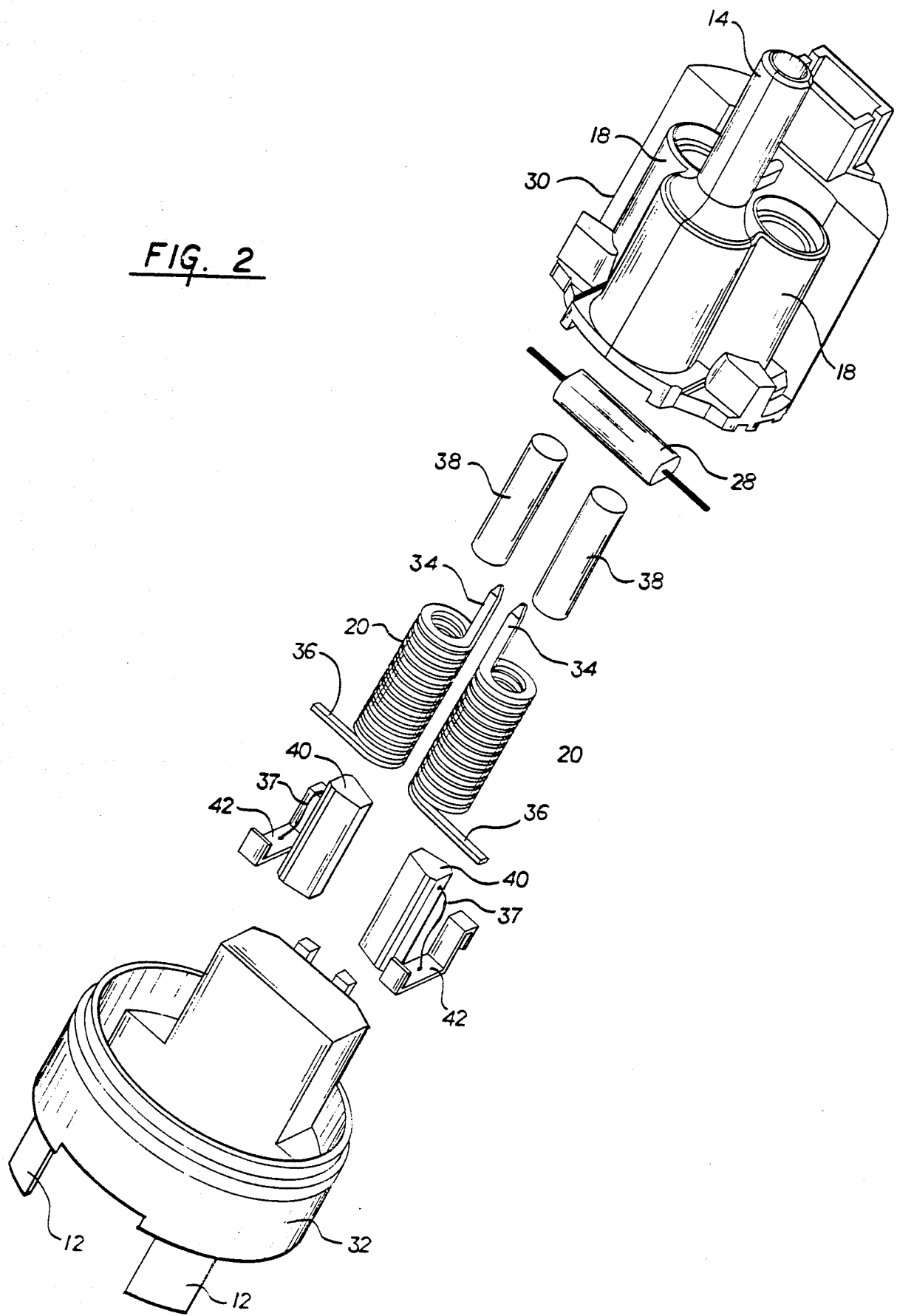
FIG. 2 is an exploded, perspective view of the end cap of FIG. 1 illustrating the internal components thereof.

Referring now to FIG. 2 there is shown an exploded, perspective view of the radio frequency suppressing fuel pump end cap 10 of FIG. 1 illustrating the various internal components thereof. As will be noted, the end cap includes a housing configured of an upper portion 30 and a lower portion 32, fabricated as previously mentioned from a fuel resistant material. As noted previously, the upper portion includes a fuel discharge port 14 which may preferably have a check valve disposed therein to limit the backflow of gasoline; and a pair of cylindrical cavities 18 to retain choke coils therein. The lower portion of the housing 32 engages and retains the upper portion 30 and cooperates therewith to retain the internal components of the end cap. The lower housing 32 includes a pair of positioning lugs 12 to engage the completed end cap 10 to the remainder of the fuel pump assembly.

The internal components of the end cap 10 include a capacitor 28, which is in one embodiment a 0.22 microfarad 250 volt capacitor. The end cap 10 further includes a pair of rectangularly shaped radio frequency choke coils 20 generally fabricated from a highly conductive material such as copper, plated copper, steel, aluminum and the like. Although various coil configurations may be employed in the present invention, coils fabricated from stock of rectangular cross section have been found particularly advantageous. Such coils 20, are illustrated in FIG. 2 and are referred to as "rectangular coils." Superior noise suppression is obtained through the use of rectangular coils because their particular configuration provides for a greater volume of metal in a given area compared to coils of circular cross section. Hence, rectangular coils of a given size present a greater impedance to high frequency noise than do coils of conventional design.

It will be noted that one end 34 of the coil 20, is coined so as to form a connector terminal adapted to interface with an external power source. Use of rectangular coil stock further facilitates fabrication of the terminals. A second or connector end 36 of the coil 20 is configured to establish electrical communication with a motor brush clip 42, as will be described in greater detail hereinbelow. It will be noted that the two coils 20 are substantially similar but for being mirror images of one another.

The suppression circuit further includes a pair of slugs or beads 38 to fit within the coils 20. These slugs are fabricated from a "soft" magnetic material, that is to say, one which is easily magnetized and demagnetized as for example a ferrite material. The slugs 38 cooperate with the coils 20 to increase their impedance to the flow of high frequency current therethrough. The device further includes a capacitor 28 as previously described as well as a pair of motor brushes 40 which are disposed to establish electrical contact between the coils 20 and the motor of the fuel pump. The brushes 40, as is well-known to those of skill in the art are fabricated from a relatively lubricious, electrically conductive material such as graphite, graphite-containing composites and the like. Associated with the brushes are a pair of connector clips 42 which establish electrical communication between the connector end 36 of the coil 20 and the motor brush 40, through a connector lead 37 affixed to the brush 40 and clip 42. Although not illustrated, the motor brushes 40 may have springs associated therewith to maintain electrical contact between the brush and the motor. Such springs will typically be located within the upper housing 30 and may be installed when the end cap is assembled or when it is attached to the fuel pump. Toward this end, the housing may be provided with openings (not shown) through which the springs may be inserted. Such openings can be adapted to be sealed by plugs after the springs are inserted and can also function to provide test points for measuring continuity through the end cap and/or motor.

All of the components of the radio frequency suppressing fuel pump end cap 10 are configured so as to readily fit within the housing 30,32 and may advantageously be encapsulated therein as for example by the addition of a potting compound as is well-known to those of skill in the art.

The order in which the components of the end cap are assembled will depend upon the particular configuration employed, it being kept in mind that the illustrations depict only one possible embodiment of the invention. In the assembly of the illustrated embodiment, the brushes 40 and clips 42 are first inserted into the upper housing 30. The coils 20 are then fitted in. The slugs 38 are inserted into the coils 20 and the capacitor 28 attached. The lower housing 32 is affixed and the end cap is encapsulated.

Figure 3:
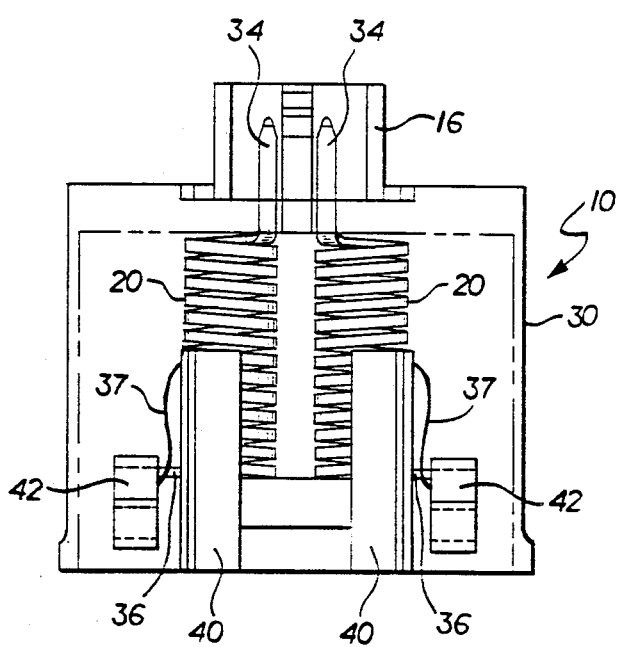
FIG. 3 is a cut-away, front elevational view of the end cap of FIG. 1 illustrating the spatial relationship of the components thereof.

Referring now to FIG. 3, there is shown a cross-sectional view of a portion of the end cap 10 better illustrating the manner in which the various components thereof are retained. Illustrated is the upper housing 30 having retained therein a pair of choke coils 20 so that the coined ends thereof 34 project into the connector housing 16 of the upper housing 30. In this manner, these coined ends 34 provide connectors to which a mating connector may be fitted so as to energize the associated fuel pump motor. The connector ends 36 of the coils 20 are each in electrical communication with an electrically conductive connector clip 42 which establishes electrical communication with the motor brushes 40 by means of the lead 37, and with the capacitor 28.

The particular design of the end cap of the present invention provides improved reliability and performance as compared to prior R.F. suppression devices. Improved performance is secured because the end cap allows the R.F. suppression circuitry to be placed as close as possible to the source of noise. Every length of unprotected wiring can act as an antenna for radiating noise. Consequently it is desired to limit or eliminate unprotected wire. Prior art devices were positioned external of the fuel pump and thus of necessity presented unprotected conductions which allowed some noise to escape. The present device is disposed so as to stop the noise right at the source and hence is much more efficient.

Reliability is greatly enhanced by the design of the present invention because the number of conductor interfaces or joints is minimized. Any connection can be a source of failure due to corrosion, separation, breakage of solder etc., and once such failure occurs, power to the fuel pump is terminated, disabling the vehicle.

In the end cap of the present invention an unbroken current path is established from the connector terminals to the brush clips, precluding failure. Prior art R.F. suppression devices included internal soldered or crimped joints which were prone to failure; additionally, such devices are an "add on" to a fuel pump thus necessitating additional terminals and connections which can corrode or become unattached.

While the foregoing describes one particular radio frequency suppressing fuel pump end cap, obviously other designs may be similarly implemented. For example, and as previously mentioned, the circuitry employed in radio frequency suppression may be varied as is well-known to those skilled in the art. Similarly, the exact configuration of the end cap may be varied to accommodate differing designs of fuel pumps, the important feature of the invention being that the radio frequency suppression circuity is disposed within the fuel pump end cap so as to provide an R.F. suppressing end cap compatible with previously available fuel pumps and adapted to fit within the space allocated therefor. In light of the foregoing, it is apparent that numerous modifications and variations of the presently described embodiments may be undertaken in light of the teachings herein. Accordingly, it is to be understood that the foregoing drawings, discussion and descriptions are merely meant to be illustrative of particular embodiments of the invention and not limitations upon the practice threof. It is the following claims, including all equivalents which are meant to define the scope of the invention.

We claim:

1. A unitary, radio frequency suppression system for a fuel pump, said system comprising:

a radio frequency noise suppression circuit interposed between the fuel pump motor and the power supply for the motor, said circuit including at least one radio frequency choke coil interposed in series with the power supply and the motor, and at least one capacitor interposed in parallel with the motor and power supply and operative to pass direct or low frequency current to the motor while blocking the flow of radio frequency energy generated by the motor;

a pair of motor brushes in electrical communication with said noise suppression circuit and disposed to establish sliding electrical contact with the armature of the pump motor; and a housing configured as an end cap of the fuel pump and further configured to support and retain said circuit and brushes in a predetermined spatial relationship therewith, said housing including (1) a pair of terminals which provide electrical communication between the power supply and the noise suppression circuit and (2) a discharge outlet for the pump, whereby said system combines end cap function and noise suppression function in a single, compact unit.

2. A system as in claim 1, wherein said noise suppression circuit presents an essentially unbroken current path from said terminals to said brushes.

3. A system as in claim 1, further comprising two choke coils, each of said terminals having one of the choke coils disposed electrically in series therewith.

4. A system as in claim 3, wherein a first plate of said capacitor is in electrical communication with one of said coils and a second plate of said capacitor is in electrical communication with the other of said coils, whereby said capacitor is disposed in a parallel electrical relationship with the motor terminals.

5. A system as in claim 1, wherein said at least one choke coil includes a ferrite slug therein.

6. A system as in claim 3, wherein each of said coils includes one coined end, and wherein the housing is configured to have the coined ends of the coils pass therethrough so that said ends are disposed in spaced apart relationship on said housing and exteriorly of said fuel pump, so as to form said pair of terminals.

7. A system as in claim 3, wherein a second end of each of said coils is in electrical communication with one of said brushes.

8. A system as in claim 7, further including a contact clip associated with each of said brushes for establishing electrical communication between said brush and the second end of one of said coils.

9. A system as in claim 6, wherein said housing further includes a connector housing molded therein configured to retain the coined ends of the coils, said socket configured to provide for attachment of a connector to the terminals.

10. A system as in claim 1, wherein said housing further includes a plurality of engagement prongs for attaching said housing to the remainder of the fuel pump.

11. A system as in claim 1, wherein said circuit is at least partially encapsulated within the housing.

12. A system as in claim 1, wherein said at least one coil is fabricated from stock having a substantially rectangular cross section.

13. An end cap for a fuel pump including therein a unitary radio frequency suppression system, said end cap comprising:

a radio frequency noise suppression circuit including (1) a first and second choke coil, said coils each having a ferromagnetic slug disposed therein, and (2) a capacitor having a first plate thereof in electrical communication with a first one of said coils and a second plate thereof in electrical communication with the second one of said coils, said circuit operating to pass low frequency or direct current energy therethrough so as to energize the electric motor of the fuel pump and to block the flow of radio frequency energy produced by the motor; said system further including:

a first motor brush in electrical communication with a second choke coil, said brushes operative to provide sliding electrical contact with the armature of the motor; and a housing configured to support and retain said circuit and brushes in a predetermined relationship, said housing including a connector housing having a pair of contacts disposed to provide electrical communication with each of the coils and a discharge outlet in mechanical communication with the fuel pump and configured to provide for the flow of fuel therethrough.

14. An end cap as in claim 13, wherein each of said choke coils includes one coined end thereof disposed so as to pass through the housing and to be retained within the socket of the housing and to provide a connector terminal.

15. An end cap as in claim 13, wherein said discharge outlet has a check valve associated therewith to prevent the backflow of fuel into said pump.

16. An end cap as in claim 13, wherein said coils are fabricated from stock having a generally rectangular cross section.

17. An end cap as in claim 13, wherein each of said brushes has associated therewith a clip configured to establish electrical contact between one of said coils and said brush.

18. An end cap as in claim 17, wherein said clip includes a lead in electrical communication with the brush.

* * * * *